R. W. JUDICK.
NUT LOCK.
APPLICATION FILED APR. 10, 1914.
1,126,225.
Patented Jan. 26, 1915.
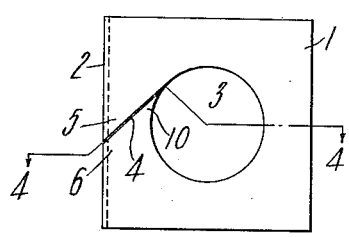
FIG. 1
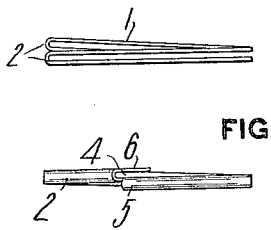
FIG. 2
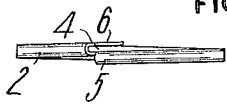
FIG. 3
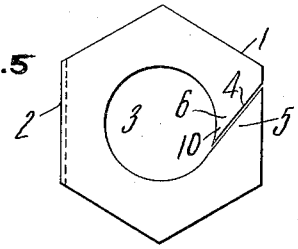
FIG. 5
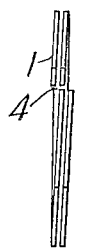
FIG. 6
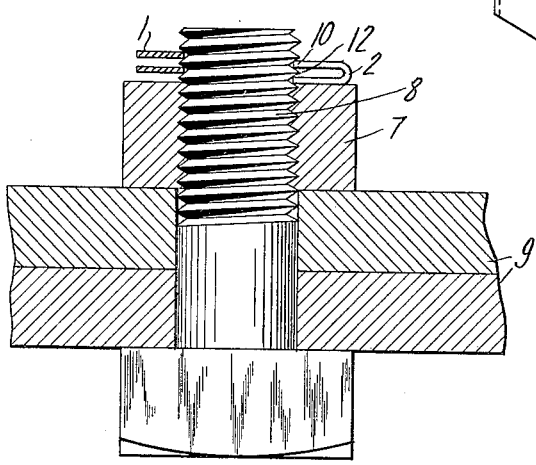
FIG. 4
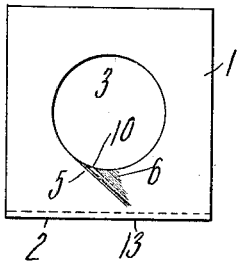
FIG. 7
FIG. 8.
WITNESSES
W. T. Holman
Elbert L. Hyde
INVENTOR
Richard W. Judick
By Fredk W. Winter
his attorney

UNITED STATES PATENT OFFICE.

RICHARD W. JUDICK, OF PITTSBURGH, PENNSYLVANIA, ASSIGNOR OF ONE-FOURTH TO CARL P. SEYLER, OF PITTSBURGH, PENNSYLVANIA, ONE-FOURTH TO WILLIAM P. McILVANE, OF ASPINWALL, PENNSYLVANIA, AND ONE-FOURTH TO MICHAEL R. NOLAN, OF GLENSHAW, PENNSYLVANIA.

NUT-LOCK.

1,126,225.      Specification of Letters Patent.      Patented Jan. 26, 1915.

Application filed April 10, 1914. Serial No. 831,023.

*To all whom it may concern:*

Be it known that I, RICHARD W. JUDICK, a resident of Pittsburgh, in the county of Allegheny and State of Pennsylvania, have invented a new and useful Improvement in Nut-Locks, of which the following is a specification.

This invention relates to nut locks.

The object of the invention is to provide a simple form of nut lock which can be used to prevent a nut from turning backwardly on the bolt or in emergency as a nut, which nut lock is effective in operation, and which can be manufactured easily and at low cost.

The invention comprises the construction and arrangement of parts hereinafter described and claimed.

In the drawings, Figure 1 represents a plan view of one form of nut lock embodying the invention; Fig. 2 is an edge view thereof from the bottom, Fig. 1; Fig. 3 is an edge view from the left in Fig. 1; Fig. 4 is a sectional view, showing the nut lock applied to a bolt, the bolt being shown in elevation and the nut lock in section on the line 4—4 Fig. 1; Fig. 5 is a plan view of a modified form of nut lock; Fig. 6 is an edge view of the same from the right in Fig. 5; and Fig. 7 is a plan view and Fig. 8 is an edge view of still other forms of nut lock.

The nut lock shown in the drawings comprises a flat plate or sheet of metal bent along a line or lines to form a plurality of flat leaves 1, which are connected at the line or lines of fold only, as at 2, and which leaves are superposed upon each other and lie in substantially parallel planes.

The nut lock may be formed of several leaves, as shown in Fig. 8, where six leaves are shown, or may consist of any other number of leaves, the other views of the drawing showing nut locks having two leaves.

The plate from which the nut lock is formed may be of any suitable shape so that the completed nut lock will have any desired shape in plan view, such as square, as shown in Fig. 1, hexagonal, as shown in Fig. 5, octagonal, round, elliptical, or any other shape. The leaves of the nut lock are provided with alined apertures 3, preferably circular, which may be formed in any suitable manner, such as by boring or punching, and which are of a diameter substantially the same as or a little greater than the diameter of the bolt at the root of its threads, due to the thickness of the leaves, as will be readily understood.

The leaves of the nut lock are each provided with a slit or opening 4 extending from the aperture 3 therein either part way through the nut lock as shown in Fig. 7, or clear through to the outer periphery of the same, as shown in Fig. 6, and which slits are preferably in that side of the nut lock where the leaves are joined, that is, at the edge 2, although they may be located elsewhere. The slits 4 may extend in any direction, but preferably are substantially tangential to the edge of the opening 3 in the leaf, as shown in Fig. 1. They may be formed in any suitable manner, as by sawing or shearing, and may for example be formed at the same time as the apertures 3 by providing the punching machine with a suitable knife or shear attachment for simultaneously slitting the washer. Either simultaneously with the formation of the slits 4 or subsequently thereto, the opposite edges of the slit in each leaf, indicated respectively at 5 and 6, are separated in a direction normal to the plane of the leaf. This may be done in any suitable manner, such as by lifting or depressing one or the other or both of the edge portions 5 and 6, so that they are forced out of the plane of the leaf. Usually, one edge portion is bent toward one side of the washer and the other edge portion toward the other side of the washer, as shown in Figs. 2 and 3, although this is not essential. This causes the edges of the openings in the apertures 3 of the leaves to assume a spiral form, the leaves being bent so that the edge of their slitted portions lies in staggered relation.

It will be observed that the opposite faces of the nut lock are not identical. On one face the projecting member is the edge portion 5 of one leaf, whose edge is a tangential continuation of the opening 3. On the other face of the nut lock, the projecting member is the edge portion 6 of the other leaf of the nut lock, whose outer edge is substantially tangent to the edge of the opening 3 of said leaf, thereby producing a sharp pointed tooth 10 with its point at one edge of the opening 3.

Fig. 4 shows the nut lock applied for preventing backward rotation of a nut 7 threaded upon a bolt 8 which clamps together two members 9. The nut lock is preferably applied to the outer end of the bolt and is screwed up tightly against the nut 7 with the projecting tooth 10 of the nut lock next to the nut. When the nut lock is screwed up tightly, this tooth is pinched or jammed between the outer face of the nut and the next thread of the bolt, indicated at 12. The more the nut tends to turn backwardly, the harder is the tooth 10 pinched or jammed, so that the resistance to turning the nut increases rather than decreases as the nut tends to turn backwardly.

When the slits 4 extend out through the edge 2 of the nut lock where the leaves are joined a multiple pinching effect is produced, because the pressure upon the tooth 10 of the leaf next to the nut is transmitted to the teeth 10 of the other leaves and pressure is therefore produced upon two or more threads of the bolt. Moreover, by slitting the washer through the edge 2 where the leaves are joined, the edges of the leaves are held more accurately in spiral position and there is less liability of deforming the nut lock or of spreading its leaves apart in applying it to a bolt or turning it thereon. Moreover, when the nut lock is slitted only part way through, as in Fig. 7, a metal bridge 13 is left which connects the edge portions on opposite sides of the slits, so that the nut lock is considerably reinforced and is much stronger.

The nut lock shown in Figs. 5 and 6 has the slits 4 extending through that edge of the nut lock opposite the edge 2 where the leaves are joined. The opposite edge portions 5 and 6 of the leaves are separated from each other in a direction normal to the plane of the nut lock, and the nut lock is applied in the same manner as shown in Fig. 4. In this case the nut lock resists backward turning by the friction of its edges upon the bolt threads, and also because the tooth 10 of the leaf next to the nut is jammed in between the nut and the next thread of the bolt, as in the construction above described. This form of nut lock is satisfactory and durable and can be made as cheaply as the first form described.

In constructing the nut lock, the edge portions of the slits 4 are preferably forced past each other a little less than the amount necessary to form the inner edges of the openings 3 into a true and continuous spiral. Consequently, when the nut lock is applied to the bolt it forms its own thread and in so doing, places the metal of each leaf under some additional strain. Consequently, it exerts considerable friction upon the threads of the bolt which also assists in preventing it from turning backwardly.

The nut lock described may be used in emergencies as a nut as it is provided with more than a full thread and is sufficiently strong of itself to exert a material clamping effect.

What I claim is:—

1. A nut lock, comprising two leaves connected at one edge only and provided with a bolt aperture therethrough, said leaves being slitted from the bolt hole outwardly toward the outer edge of the nut lock, the edges of the slits being spread apart in a direction normal to the plane of the nut lock to form a tooth adapted to enter the space between the bolt threads and be pinched between said threads and the nut when the nut lock is turned up against the nut.

2. A nut lock, comprising two leaves connected at one edge only and provided with a bolt aperture therethrough, said leaves being slitted from the bolt hole outwardly toward the edge where the two leaves are connected the edges of the slits being spread apart in a direction normal to the plane of the nut lock to form a tooth adapted to enter the space between the bolt threads and be pinched between said threads and the nut when the nut lock is turned up against the nut.

3. A nut lock, comprising two leaves connected at one edge only and provided with a bolt aperture therethrough, said leaves being slitted from the bolt hole outwardly to a point short of the outer edge of the nut lock the edges of the slits being spread apart in a direction normal to the plane of the nut lock to form a tooth adapted to enter the space between the bolt threads and be pinched between said threads and the nut when the nut lock is turned up against the nut.

4. A nut lock, comprising two leaves connected at one edge only and provided with a bolt aperture therethrough, said leaves being slitted from the bolt hole outwardly toward that edge of the nut lock where the two leaves are connected and to a point short of the outer edge of the nut lock the edges of the slits being spread apart in a direction normal to the plane of the nut lock to form a tooth adapted to enter the space between the bolt threads and be pinched between said threads and the nut when the nut lock is turned up against the nut.

In testimony whereof, I have hereunto set my hand.

RICHARD W. JUDICK.

Witnesses:
ELBERT L. HYDE,
GLENN H. LERESCHE.